US012446849B2

(12) United States Patent
Hoelscher et al.

(10) Patent No.: US 12,446,849 B2
(45) Date of Patent: Oct. 21, 2025

(54) SYSTEMS AND METHODS FOR NON-INVASIVE MEASUREMENT OF INTRACRANIAL PRESSURE

(71) Applicant: BURL Concepts, Inc., San Diego, CA (US)

(72) Inventors: Thilo Hoelscher, San Diego, CA (US); Thomas Francis Doyle, San Diego, CA (US); Mark Banham, San Diego, CA (US)

(73) Assignee: BURL Concepts, Inc., San Diego, CA (US)

( * ) Notice: Subject to any disclaimer, the term of this patent is extended or adjusted under 35 U.S.C. 154(b) by 0 days.

(21) Appl. No.: 18/433,121

(22) Filed: Feb. 5, 2024

(65) Prior Publication Data

US 2024/0285251 A1    Aug. 29, 2024

Related U.S. Application Data

(60) Provisional application No. 63/578,621, filed on Aug. 24, 2023, provisional application No. 63/483,190, filed on Feb. 3, 2023.

(51) Int. Cl.
| | |
|---|---|
| *A61B 8/08* | (2006.01) |
| *A61B 5/0205* | (2006.01) |
| *A61B 5/022* | (2006.01) |
| *A61B 8/00* | (2006.01) |

(52) U.S. Cl.
CPC .......... *A61B 8/0808* (2013.01); *A61B 5/0205* (2013.01); *A61B 8/481* (2013.01); *A61B 5/022* (2013.01)

(58) Field of Classification Search
CPC ......... A61B 8/0808; A61B 8/481; A61B 8/04; A61B 5/031; A61B 5/021
See application file for complete search history.

(56) References Cited

U.S. PATENT DOCUMENTS

2019/0108906 A1*    4/2019  Unser ................. G06T 7/20

FOREIGN PATENT DOCUMENTS

WO    WO-2018176005 A1 *  9/2018 ............. G16H 50/30

\* cited by examiner

*Primary Examiner* — Boniface N Nganga
(74) *Attorney, Agent, or Firm* — KPPB LLP

(57) ABSTRACT

Systems and methods for non-invasively measuring intracranial in accordance with embodiments of the invention are illustrated. One embodiment includes a method for estimating an intracranial pressure of a patient, including introducing a tracer into the blood of a patient, recording, using an imaging device, the traversal of the tracer through a brain of the patient as a kinetic curve, estimating a mean transit time (MTT) of the tracer through the brain of the patient based on the kinetic curve, measuring a mean arterial pressure (MAP) of the patient, calculating an intracranial pressure index as MAP−Ck/MTT, where C is a constant to scale proportional relationships based on healthy patient population characteristics, and k is a constant in pressure/time, and providing the intracranial pressure index. In various embodiments, regions of the brain unaffected by transient vascular abnormalities are identified and are used for data collection.

21 Claims, 6 Drawing Sheets

SYSTEMS AND METHODS FOR NON-INVASIVE MEASUREMENT OF INTRACRANIAL PRESSURE

CROSS-REFERENCE TO RELATED APPLICATIONS

The current application claims the benefit of and priority under 35 U.S.C. § 119(e) to U.S. Provisional Patent Application No. 63/483,190 entitled "Systems and Methods for Non-Invasive Measurement of Intracranial Pressure" filed Feb. 3, 2023, and U.S. Provisional Patent Application No. 63/578,621 entitled "Systems and Methods for Non-Invasive Measurement of Intracranial Pressure" filed Aug. 24, 2023. The disclosures of U.S. Provisional Patent Application Nos. 63/483,190 and 63/578,621 are hereby incorporated by reference in its entirety for all purposes.

FIELD OF THE INVENTION

The present invention relates generally to ultrasound diagnostic technology, and more specifically to apparatuses and methods for detecting internal injury using non-invasive devices.

BACKGROUND

Ultrasound waves are often described as sound waves having frequencies greater than 20 kHz. Ultrasound has been used in the medical field to observe the interior of the human body in a non-invasive manner. The ultrasound is applied using an ultrasound transducer that typically comes into contact with the patient's skin. Ultrasound is readily absorbed in air, so gel is often used between the transducer and the skin to enhance the transmission of ultrasound. In some cases, the gel is a liquid substance. In other cases, a gel pad is used where the gel is molded into semi-solid disks.

Microbubbles are bubbles that have a diameter on the micrometer scale, in the range of 1 micrometer which is smaller that a blood cell. Microbubbles can be used as ultrasound contrasting agents ("UCA") because they can oscillate in the presence of an ultrasound energy field, and also may reflect ultrasound waves depending on frequency and amplitude of the applied ultrasound. The behaviors of the microbubbles provide enhanced signal detection, improving the detection of the tissues which are perfused with the microbubbles and distinguishing those tissues from other tissues that are not similarly perfused.

SUMMARY OF THE INVENTION

Systems and methods for non-invasively measuring intracranial in accordance with embodiments of the invention are illustrated. One embodiment includes a method for estimating an intracranial pressure of a patient, including introducing a tracer into the blood of a patient, recording, using an imaging device, the traversal of the tracer through a brain of the patient as a kinetic curve, estimating a mean transit time (MTT) of the tracer through the brain of the patient based on the kinetic curve, measuring a mean arterial pressure (MAP) of the patient, calculating an intracranial pressure index as MAP−Ck/MTT, where C is a constant to scale proportional relationships based on healthy patient population characteristics, and k is a constant in pressure/time, and providing the intracranial pressure index.

In a further embodiment, the method further includes steps for identifying a region of the patient's brain unaffected by a transient vascular abnormality, recording the traversal of the tracer through the identified hemisphere, and generating the kinetic curve used for identifying the onset and the peak of flow using only the recording of the traversal through the identified brain region.

In still another embodiment, C is between 400 and 500.

In a still further embodiment, C is 448.

In yet another embodiment, the MAP is calculated as (SP+(2*DP))/3, where SP is systolic pressure of the patient and DP is diastolic pressure of the patent.

In a yet further embodiment, the mean arterial pressure is measured using a blood pressure monitor.

In another additional embodiment, the tracer includes microbubbles, and the imaging device is at least one ultrasound transducer.

In a further additional embodiment, estimating MTT includes identifying a first point and a second on the kinetic curve, where the first point and second point are at repeatably identifiable locations, measuring the distance between the first point and the second point as a value proportional to MTT.

In another embodiment again, estimating MTT includes calculating a full peak/half width parameter from the kinetic curve.

In a further embodiment again, estimating MTT includes calculating a half peak/full width parameter from the kinetic curve.

One embodiment includes an intracranial pressure measurement device, including at least imaging device, a processor, and a memory containing an intracranial pressure (ICP) measurement application that configures the processor to record, using the at least one ultrasound transducer, the traversal of a tracer through a brain of a patient as a kinetic curve, estimate a mean transit time (MTT) of the tracer through the brain of the patient based on the kinetic curve, measure a mean arterial pressure (MAP) of the patient, calculate an intracranial pressure index as MAP−Ck/MTT, where C is a constant to scale proportional relationships based on healthy patient population characteristics, and k is a constant in pressure/time, and provide the intracranial pressure index.

In still yet another embodiment, the intracranial pressure measurement application further directs the processor to identify a region of the patient's brain unaffected by a transient vascular abnormality, record the traversal of the tracer through the identified hemisphere, and generate the kinetic curve used for identifying the onset and the peak of flow using only the recording of the traversal through the identified brain region.

In a still yet further embodiment, C is between 400 and 500.

In still another additional embodiment, C is 448.

In a still further additional embodiment, the MAP is calculated as (SP+(2*DP))/3, where SP is systolic pressure of the patient and DP is diastolic pressure of the patent.

In still another embodiment again, the intracranial pressure measurement device is communicatively coupled to a blood pressure measurement device configured to record the systolic pressure and diastolic pressure of the patient.

In a still further embodiment again, the blood pressure measurement device is a blood pressure measurement cuff.

In yet another additional embodiment, the tracer includes microbubbles, and the imaging device is at least one ultrasound transducer.

In a yet further additional embodiment, to estimate MTT, the ICP measurement application further directs the processor to identify a first point and a second on the kinetic curve, where the first point and second point are at repeatably identifiable locations, measure the distance between the first point and the second point as a value proportional to MTT.

In yet another embodiment again, to estimate MTT, the ICP measurement application further directs the processor to calculate a full peak/half width parameter from the kinetic curve.

In a yet further embodiment again, to estimate MTT, the ICP measurement application further directs the processor to calculate a half peak/full width parameter from the kinetic curve.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

DETAILED DESCRIPTION

Turning now to the drawings, systems and methods of detecting intracranial pressure (ICP) are illustrated. ICP, the pressure resisting blood flow into the head, can be a result of various fluids in and around the skull and/or brain tissue. On its own, drastic increases in ICP can lead to brain damage, spinal damage, and/or restriction of blood flow, any of which may be deadly. Further, heightened ICP can correspond to a multitude of life-threatening conditions including but not limited to brain aneurysms, brain tumors, serious head injury, meningitis, hematomas, brain clots, seizures, and strokes. For brain-related injuries, the longer a patient goes without treatment, the higher the risk of long-term brain damage or death.

Despite ICP's clinical relevance, it remains very difficult to measure. Conventionally, a catheter needs to be surgically implanted in the brain, or a bolt is inserted through the skull, both in order to directly measure ICP. These procedures are highly invasive and time consuming. In order to address these limitations, systems and methods described herein enable quick, non-invasive measurement of ICP by leveraging radiographic and/or sonographic techniques. In many embodiments, a non-invasive scanning modality is used to track the movement of the tracer through the patient's brain. Based on the signal generated by the wash-in of the tracer through the brain, in combination with blood pressure information, ICP can be non-invasively measured. In many embodiments, microbubbles are used as at tracer for an ultrasound or magnetic resonance imaging scan. In many embodiments, the amount of time it takes for a bolus of tracer to fully wash-in to the brain is used to calculate ICP. ICP measurement systems are discussed in further detail below.

Intracranial Pressure Measurement Systems

ICP measurement systems obtain and process scans of a patient's brain in order to non-invasively measure ICP. In many embodiments, ICP measurement devices may incorporate a portable scanning modality, e.g. an ultrasound transducer. However, ICP measurement devices may obtain medical imaging data from medical imaging devices including, but not limited to, magnetic resonance imaging (MRI) machines, positron emission tomography (PET) machines, computed tomography (CT) machines, other ultrasound machines, and/or any other imaging device capable of measuring tracer movement over time through the brain as appropriate to the requirements of specific applications of embodiments of the invention. In many embodiments, ICP measurement devices are implemented using portable ultrasound devices as disclosed in U.S. Pat. No. 11,006,924, titled "Portable Ultrasound Device," filed Mar. 23, 2018 and granted May 18, 2021, which is hereby incorporated by reference in its entirety.

Figure 1:
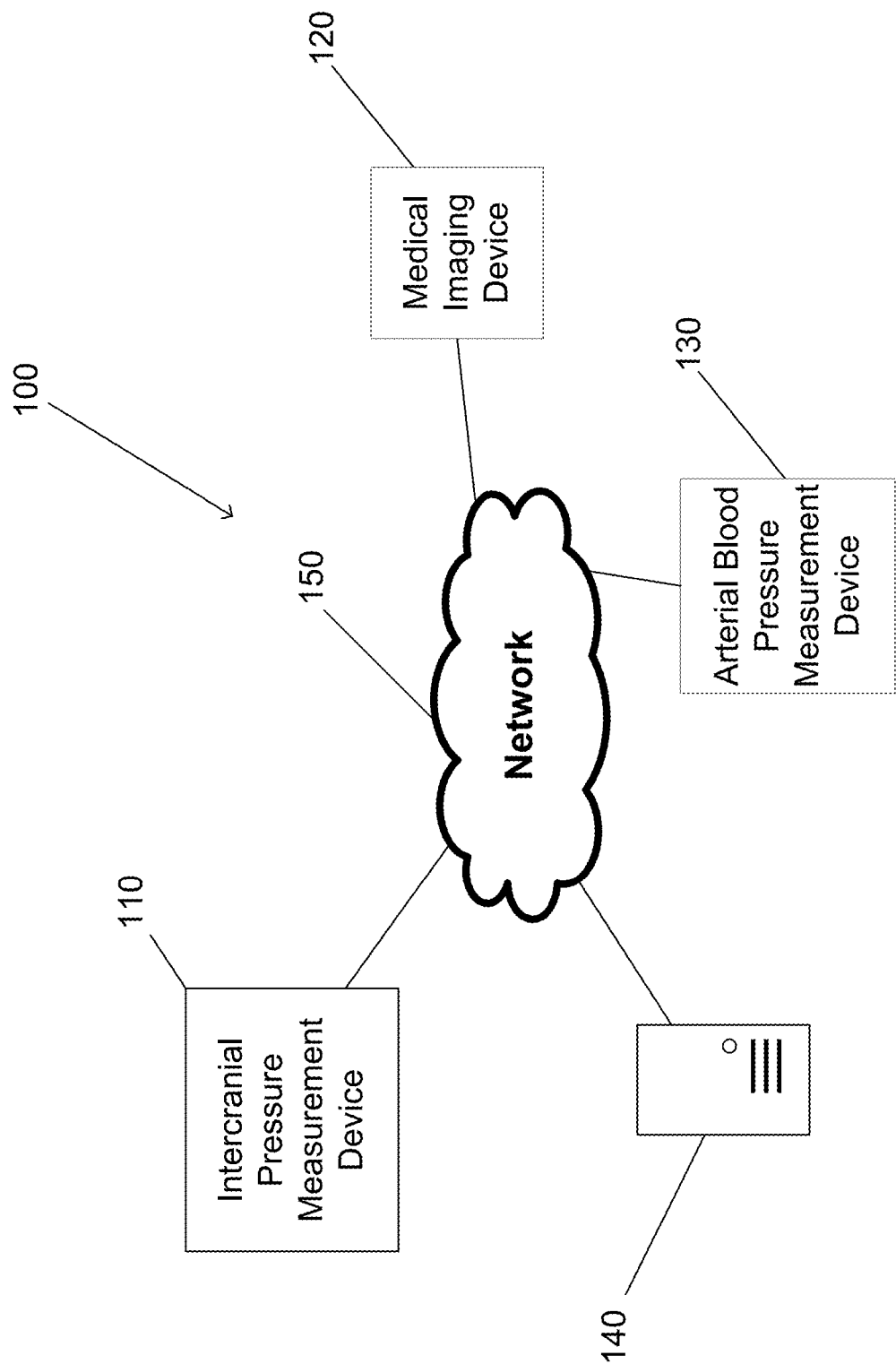
FIG. 1 is a system diagram for an ICP measurement system in accordance with an embodiment of the invention.

Turning now to FIG. 1, an intracranial pressure measurement system in accordance with an embodiment of the invention is illustrated. System 100 includes ICP measurement device 110 and a medical imaging device 120. ICP measurement devices can obtain imaging data from medical imaging devices. In many embodiments, ICP measurement devices incorporate one or more medical imaging devices into the same platform. In many embodiments, the imaging data describes a tracer signal which measures the amount of tracer in the brain over time. For example, a single portable device may include one or more ultrasound transducers in order to enable imaging without the need for a large, external scanner (e.g. an MRI machine).

System 100 also includes an arterial blood pressure measurement device. In numerous embodiments, the arterial blood pressure measurement device is a blood pressure cuff, however any number of different arterial blood pressure measurement modalities can be used without departing from the scope or spirit of the invention. Similarly, ICP measurement devices may incorporate an arterial blood pressure measurement device.

System 100 further includes a medical records server 140. In many embodiments, ICP measurement devices provide measured ICP to medical records servers in order to save ICP measurements for a particular patient in their electronic health record (EHR, sometimes referred to as electronic medical records, or EMR). Stored and/or recorded ICP values can be used by medical professionals and/or other medical systems to assist with diagnosis and/or client health monitoring and management.

System 100 additionally includes a network 150 by which components of the system can communicate. Networks can be made of multiple networks which may be of different modalities, e.g. wired and/or wireless networks. However, as can readily be appreciated, in many embodiments, ICP measurement devices may not communicate with medical records servers, and/or may not communicate with medical imaging devices (e.g. when an imaging modality is incorporated into the ICP measurement device. As such, any number of different system architectures can be used without departing from the scope or spirit of the invention.

Figure 2:
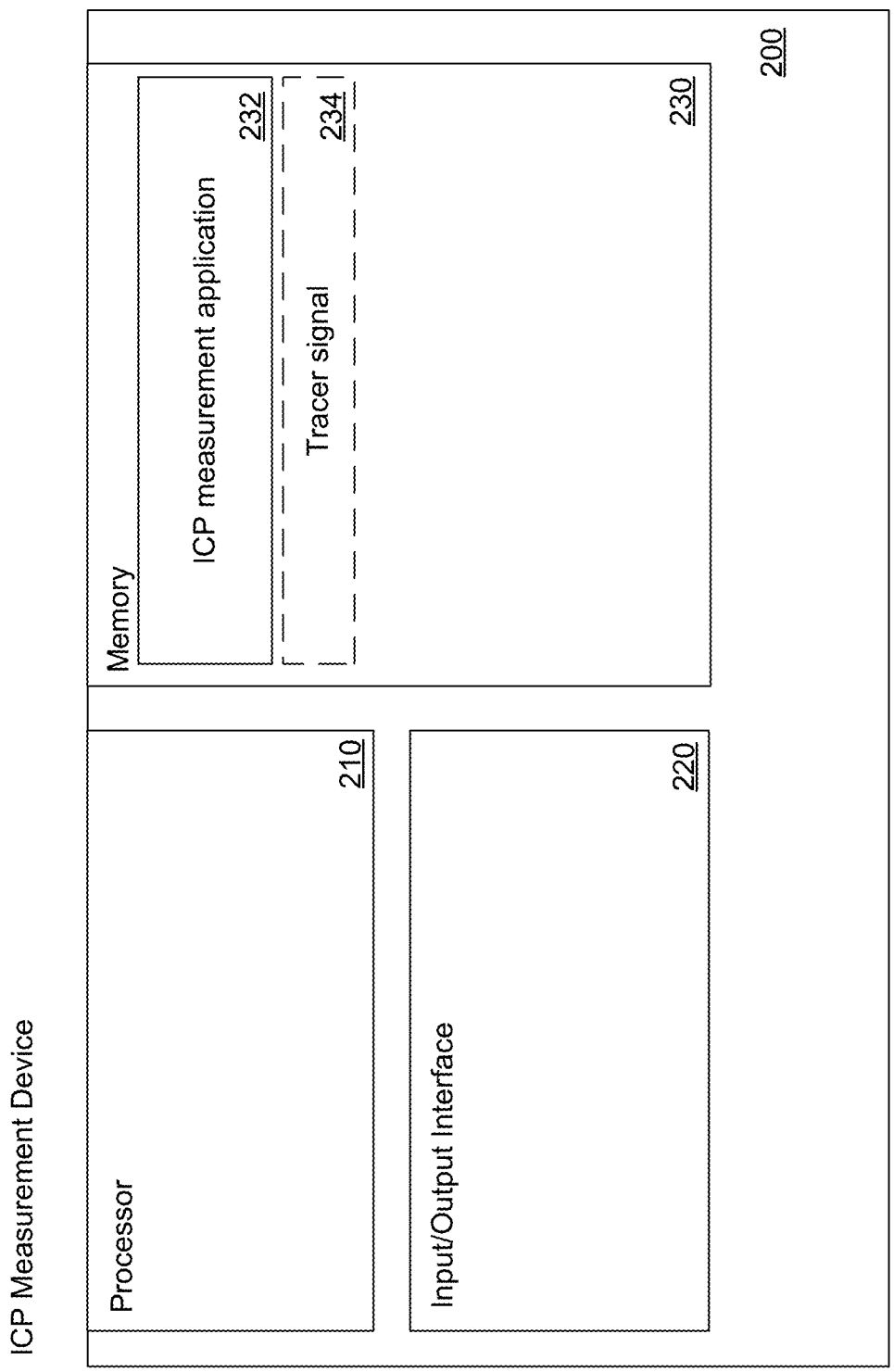
FIG. 2 is a block diagram for an ICP measurement device in accordance with an embodiment of the invention.

Turning now to FIG. 2, a block diagram for an ICP measurement device in accordance with an embodiment of the invention is illustrated. ICP measurement device 200 includes a processor 210. In many embodiments, the processor is one or more logic processing circuitries including (but not limited to) a central processing unit (CPU), a graphics processing unit (GPU), an application-specific integrated circuit (ASIC), a field-programmable gate array (FPGA), and/or any other logic processing circuitry capable of performing processes described herein as appropriate to the requirements of specific applications of embodiments of the invention. ICP measurement device 200 further includes an input/output (I/O) interface 220. In many embodiments, I/O interfaces are used to communicate with other devices such as (but not limited to) medical record servers, smart phones, smart TVs, displays, medical imaging devices, arterial blood pressure measurement devices, and/or any other connected device as appropriate to the requirements of specific applications of embodiments of the invention.

ICP measurement device 200 additionally includes a memory 230. Memories can be made of volatile memory, non-volatile memory, and/or any combination thereof. Memory 230 contains an ICP measurement application 232 which configures the processor to perform processes as described herein. In numerous embodiments, the memory 230 at various times may include imaging data 234 obtained via a medical imaging device for processing, and/or any other data that may be desirable to keep in memory. As can readily be appreciated, alternative architectures for ICP measurement devices can be used which are capable of measuring ICP using processes described herein without departing from the scope or spirit of the invention. For example, in many embodiments, an integrated ultrasound transducer may produce a signal which is processed via a specialized logic processing circuitry without the need for an application. Further, ICP measurement devices may include any number of different visual and/or auditory display devices capable of indicating measured ICPs, and/or providing warnings for measured ICPs in a dangerous range. Processes for non-invasively measuring ICP are described in further detail below.

Measurement of Intracranial Pressure

Non-invasive measurement of intracranial pressure can be achieved by analyzing the movement of blood through the brain. The flow rate for a fluid (e.g. blood) through a vessel (e.g. the circulatory system) is proportional to the pressure differential across the vessel. Therefore, by measuring arterial blood pressure and the rate of blood flow through the brain, ICP can be derived.

The pressure pushing blood into the head is the mean arterial pressure (MAP). Arterial pressure is measured using two numbers, the systolic pressure (SP) and the diastolic pressure (DP). MAP can be calculated as:

$$MAP = \frac{SP + (2*DP)}{3}$$

ICP, as noted above, is the pressure resisting blood flow into the head. The differential between MAP and ICP drives the rate of blood flow through the head, and is referred to as the cerebral prefusion pressure (CPP). The rate of blood flow through the brain can be expressed by the average time for blood to flow through the brain from the arterial entrance to the venous exit. The transit time, referred to as mean transit time (MTT), is inversely proportional to CPP. For example, a higher CPP leads to faster flow, and therefore a lower MTT.

MTT can be measured using radiographic imaging. Tracers (e.g. microbubbles) can be used to track blood flow through the brain. In many embodiments, a "half peak/full width" (HPFW) parameter can be derived from the kinetic curve representing the flow of the tracer through the brain, which is proportional to MTT. HPFW is measured using two arbitrary points on the kinetic curve found by locating the peak amplitude and moving downward on the curve in both directions to the two points at 50% of the peak amplitude, where the HPFW is the width (in seconds) between these two points.

However, especially in the acoustic domain, it can be difficult to measure for a variety of reasons. The signal is often noisy and brain injury can disrupt the flow such that it can be difficult to precisely measure the transit time or HPFW. On average, during the traversal of the tracer in the brain, the wash-in period of the kinetic curve tends to be more consistent than the wash-out period. In various embodiments, a second type of measurement referred to as "full peak/half width" (FPHW), or "time to peak" (TTP) is derived from the kinetic curve, which is proportional to MTT and therefore serves as a proxy for HPFW. FPHW reflects the time from first identification of tracer in the brain to the peak amount of tracer in the brain is measured. In this way, if tracer is staying in the brain due to hemorrhage or other injury, a clear read would still be made. FPHW can be derived from the kinetic curve of the microbubble bolus by detecting the earliest point the amplitude rises above a noise floor indicating arrival of the contrast agent, where FPHW is the time between this onset at zero amplitude and a peak at 100% amplitude, measured in seconds. Similarly, any two arbitrary points on the kinetic curve can be selected by convention, and the time differential between the points used, requiring only that the definitions of the points can be clearly articulated and that the points can be detected consistently enough to be useful.

Experimentally, HPFW∝FPHW, and CPP∝k/TTP>>ICP∝CPP/MAP–k/TTP, where k is an empirically derived constant in mmHg/sec. However, any two consistently identifiable points on the kinetic curve can be used as a proportionate metric to MTT.

For a human body, CPP=MAP–ICP, then ICP=MAP–CPP, assuming no transient vascular abnormalities, and CPP∝k/MTT>>CPP∝k/HPFW. Because HPFW∝FPHW, CPP∝k/TTP>>ICP∝MAP–k/TTP. For the nominal of a population of healthy patients, ICP=MAP–Ck/TTP, where C is a constant to scale proportional relationships based on healthy patient characteristics. Experiments to date indicate that a baseline value of C=448, however depending on the methods used and patient population, this number may shift. For example, in various embodiments, C is between 400 and 500.

For an individual healthy patient without transient vascular abnormalities affecting flow, ICP=MAP–Ck/TTP–$\Delta_p$, where $\Delta_p$ is the difference in blood pressure drop through the individual's vascular system in the brain tissue versus the population nominal. In many embodiments, changes in ICP can be calculated reliably without knowing $\Delta_p$ because it is static for an individual. However, to account for this, $ICP_{range}$=MAP–Ck/TTP, where the variability of $\Delta_p$ is well characterized for reporting an ICP range.

For an individual patient that may have transient vascular abnormalities affecting flow, ICP=(MAP–Ck/TTP)–($\Delta_p$+$\Delta_t$), where $\Delta_t$ is the additional blood pressure drop through the individual's vascular system in the brain tissue due to a transient condition. An ICP index (also referred to as a SOFI index) can be defined to address unknown $\Delta_p$ and $\Delta_t$. In numerous embodiments, the ICP index correlates to total all blood flow resistance variables, not just resistance due to ICP. $(\Delta_p+\Delta_t)$ can be added to both sides of the above equation: ICP+$(\Delta_p+\Delta_t)$=MAP−Ck/TTP. Therefore, ICP index=ICP+$(\Delta_p+\Delta_t)$>>ICP Index=MAP−Ck/TTP. With a characterization of the variability of $\Delta_p$ for reporting within a range as per above ($\Delta_p$<=range): $ICP_{range}$=ICP Index+$\Delta_t$. With methods to detect conditions where $\Delta_t$≈zero, i.e. that transient vascular abnormalities are likely not present in a specific patient and/or a specific tissue region of the patient utilized as the basis for calculations, $ICP_{range}$=ICP Index.

Given the above, in a patient where the patient is not experiencing transient vascular abnormalities, then the ICP index can be accurately used without additional measurement. When Δt is not zero in a subject, additional measurements can be taken to avoid having to characterize it. Currently, there are no known transient vascular abnormalities that affect both the middle cerebral artery tissue regions at the same time, at least not significantly. In all known cases, if the middle cerebral artery region in one hemisphere is affected by an abnormality, the opposite middle cerebral artery region in the other hemisphere will not be significantly affected. Upon identifying the unaffected region, the calculations using MAP and CCP can be performed for measurements of that tissue knowing $\Delta_t$=0. This means that the ICP index above can be calculated for a patient currently experiencing a transient vascular abnormality without having to measure $\Delta_t$. Techniques to measure certain of the above parameters and identify hemispheres unaffected by transient vascular abnormalities are additionally described in U.S. Pat. No. 11,006,924 titled Portable Ultrasound Device, granted May 18, 2021, the disclosure of which is hereby incorporated by reference in its entirety.

Figure 3:
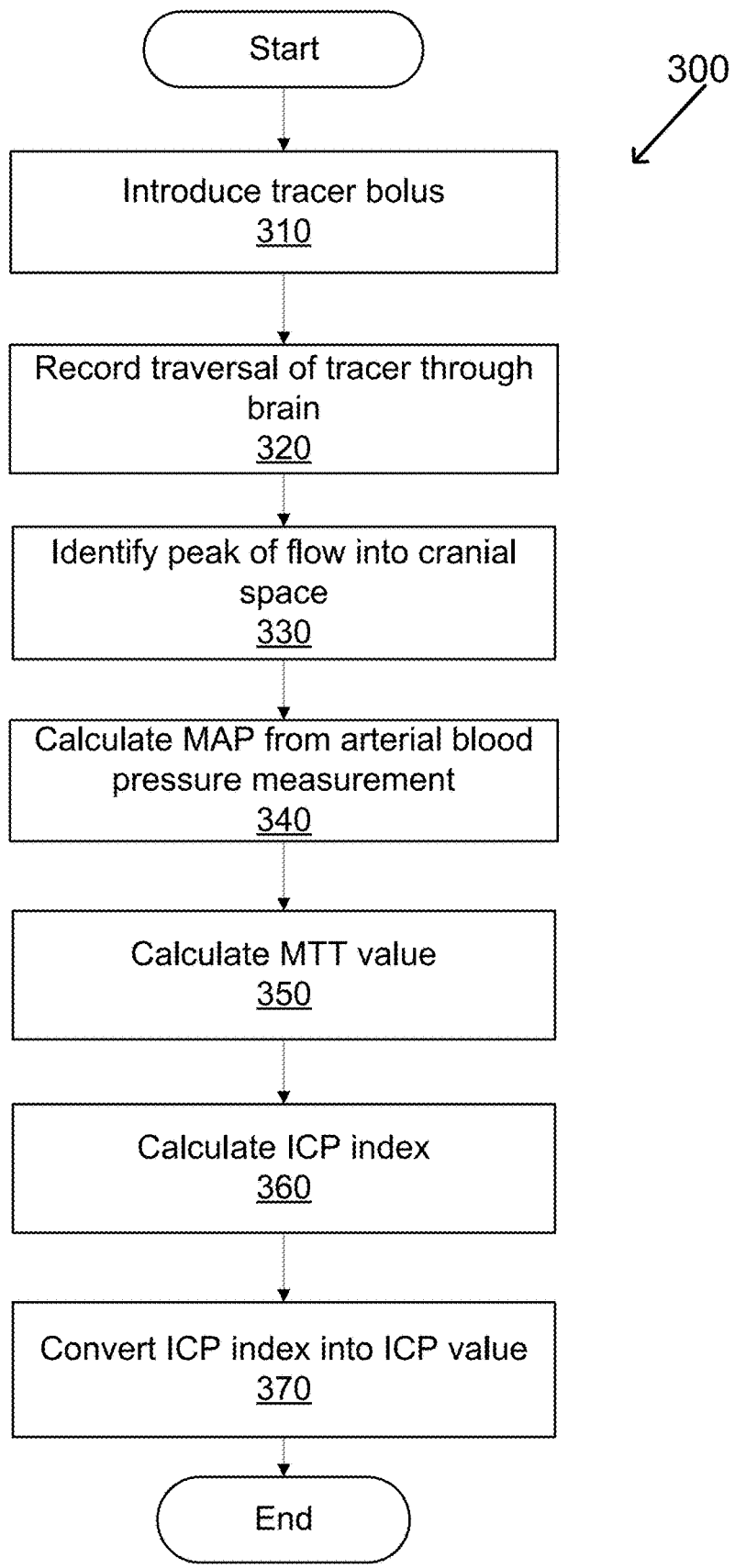
FIG. 3 is a flow chart illustrating an ICP measurement process in accordance with an embodiment of the invention.

Turning now to FIG. 3, a process for measuring ICP in accordance with an embodiment of the invention is illustrated. Process 300 includes introducing (310) tracers into the patient's blood. Tracers may be released into the body through modes including (but not limited to) intravenous injection, oral ingestion, and inhalation. The traversal of the tracer through the patient's brain is recorded (320). In many embodiments, the traversal is recorded as a signal measuring the amplitude of acoustic response from a microbubble tracer in response to ultrasound. However, the signal can be any one measuring the amount of tracer in the brain at a given time using any number of different modalities as discussed above. In many embodiments, The time at which the tracer enters the cranial space is marked. For a patient with no tracer in their system, the signal may be marked at the timestamp at which any tracer is identified. If a patient has tracer in their system and it has not completely washed out, the last local minimum followed by a significant increase in tracer presence can be used as the entrance mark. For embodiments in which the tracers are microbubbles, ultrasound devices may check the location of microbubbles by checking for characteristic microbubble harmonic responses and/or amplitude markers that are known to be consistently present when microbubbles are present. In a variety of embodiments, the formulation of the microbubbles introduced can be derived by measuring their characteristic microbubble responses.

The peak of the received signal is identified (340). Any number of different modalities can be used to mark the peak, including (but not limited to) searching for a local maximum after the entrance mark, searching for a maximum value within a window around a series of identified local maxima, and/or any other number of different peak identification methods as appropriate to the requirements of specific applications of embodiments of the invention.

Figure 4:
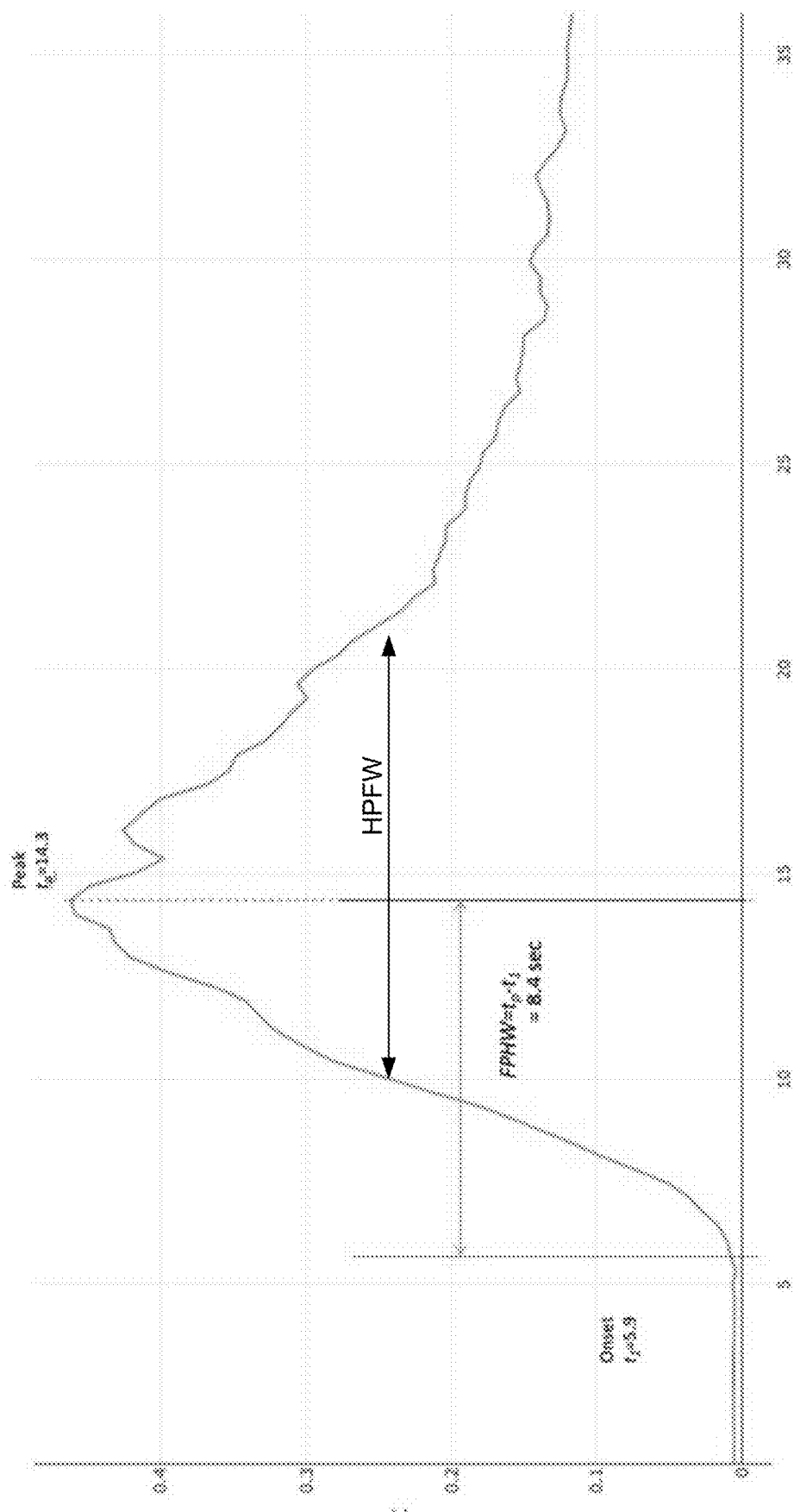
FIG. 4 is an example annotated tracer signal in accordance with an embodiment of the invention.

The patient's arterial blood pressure is taken at substantially the same time as the tracer movement is recorded and used to calculate (350) MAP. The MTT value is calculated (360) from the received signal and used to calculate (370) an ICP index using the above equations. As noted above, the kinetic curve can be used to derive a value that is proportional to MTT, which can be used as the MTT value for the purposes of generating the ICP index. In numerous embodiments, FPHW is used. In some embodiments, HPFW is used. In a variety of embodiments, any two arbitrary points that are repeatedly identifiable across patients can be used. An example signal with marked points and FPHW in accordance with an embodiment of the invention is illustrated in FIG. 4. The ICP index can be directly converted (380) to an ICP value and/or a likely range of ICP values based on historical data, and/or a percentile value of where the patient lies with respect to other patients.

As can be readily appreciated, direct measurement of MTT may be used instead of FPHW. For example, HPFW can be used instead when appropriate. Further, ICP indices can be used in clinical settings instead of an exact ICP value without departing from the scope or spirit of the invention.

Figure 5:
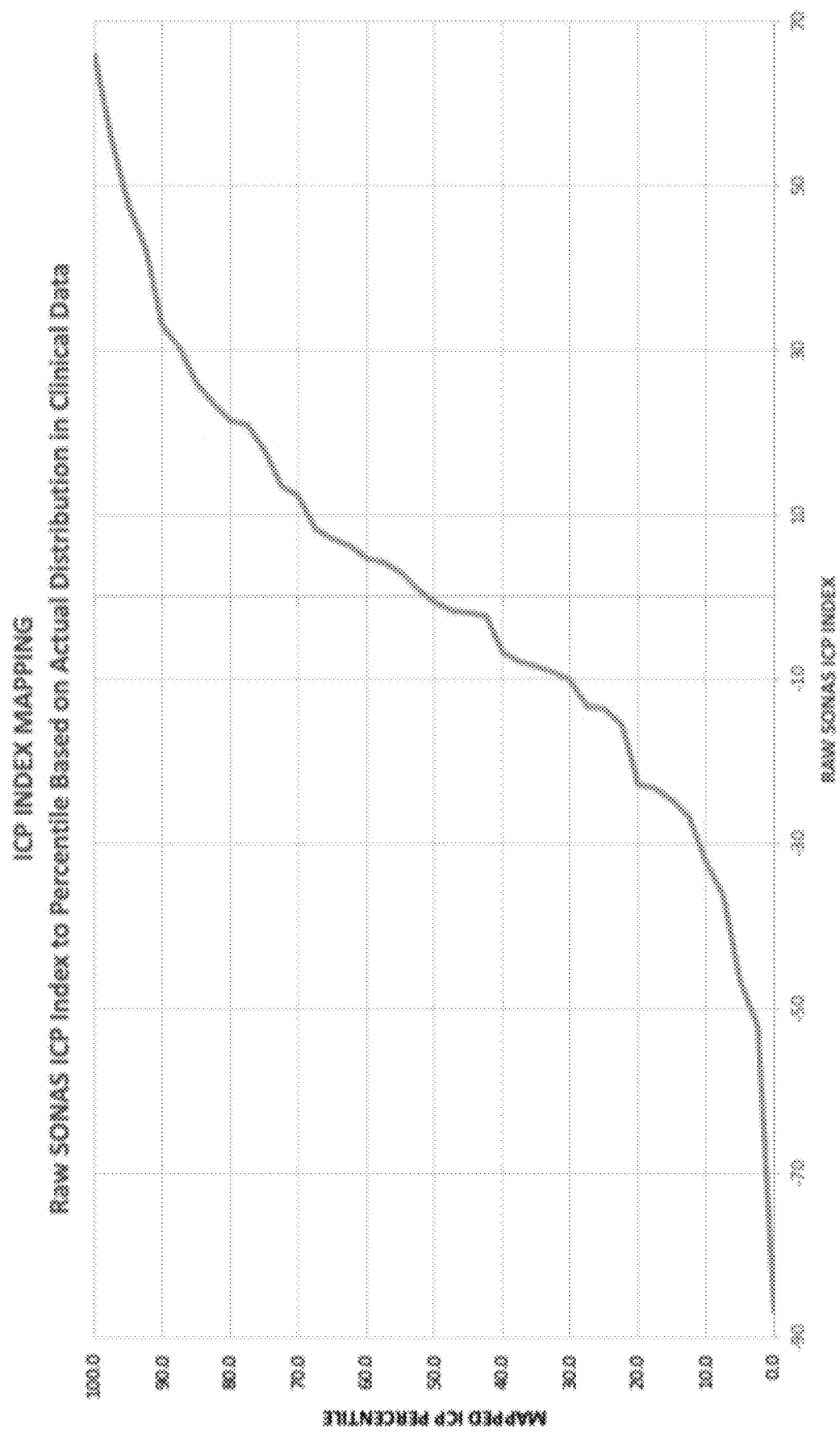
FIG. 5 is a chart showing ICP percentile mapped to ICP index in accordance with an embodiment of the invention.
Figure 6:
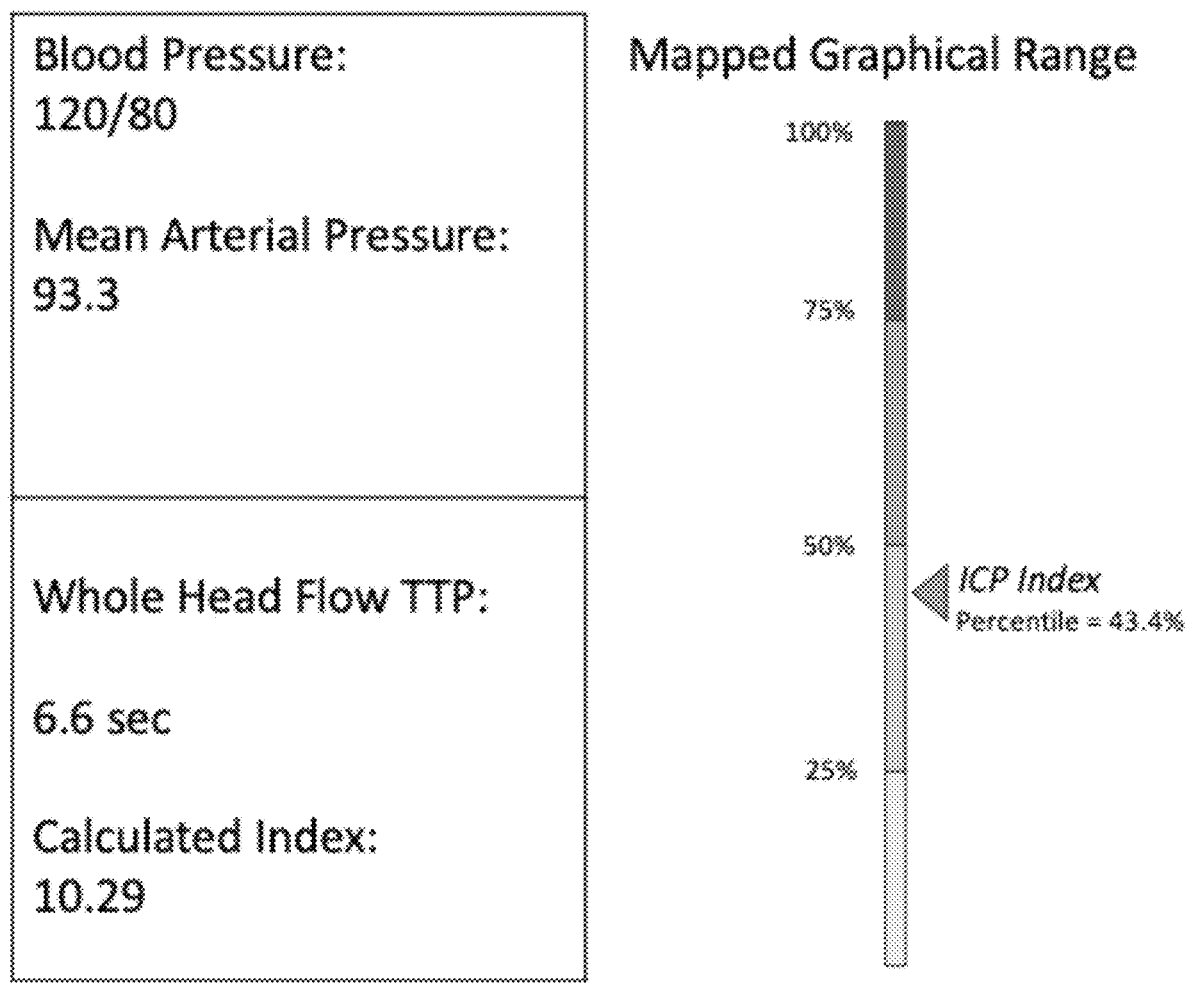
FIG. 6 is an example ICP measurement report in accordance with an embodiment of the invention.

FIG. 5 illustrates how an ICP index may be mapped to the percentile scale established by observed measurements in accordance with an embodiment of the invention. In this case, the indices from the healthy patient group (i.e., the middle portion) have relatively tight distributions. Systems operating in accordance with many embodiments accordance may naturally produce and/or normalize derived ICP index values consistent with normal curves. An example report for an arbitrary, imaginary patient in accordance with an embodiment of the invention is illustrated in FIG. 6. A discussion of using microbubbles as tracers is found below.

Using Microbubbles as Acoustic Markers

In accordance with many embodiments of the invention, tracers including but not limited to microbubbles can be used with ICP measurement devices as acoustic markers. When microbubbles are exposed to certain signals (e.g., ultrasound), they can resonate and generate harmonic signal responses. Microbubbles may also be detected via an MRI or by a different imaging modality depending on their composition. Microbubble harmonic responses can be detected by intracranial pressure measurement devices, and intracranial pressure measurement devices can determine the position of microbubbles based on the detected harmonic responses. In some embodiments, microbubbles may be administered as a bolus. However, microbubbles can be delivered using any number of modalities including (but not limited to) orally, as an inhalant, or using an IV.

Further, microbubbles can be administered to the patient multiple times while the intracranial pressure measurement device is in use in order to get multiple reads. In Intracranial pressure measurement devices can alert users that they are ready for microbubbles to be administered to the patient. Alerts can be visual using a display and/or a light. Alternatively or additionally, alerts may be auditory, such as using a speaker. In numerous embodiments, medical-grade microbubbles are used for the diagnostic process. Microbubbles can have characteristic signal responses per unit of applied acoustic pressure and a characteristic latency for the signal response. Because microbubbles can be carried by the blood, the microbubble harmonic responses can be used to measure blood movement in the brain.

In numerous embodiments, an intracranial pressure measurement device can monitor whether microbubbles have been introduced too early during "baseline" measurements. Early administration of microbubbles can be detected by checking for at least one frequency and/or amplitude marker that is a reliable indicator of the presence of microbubbles (e.g. a harmonic of the ultrasound frequency that is typically detected in the presence of microbubbles). In some embodiments, intracranial pressure measurement devices may check whether or not microbubbles have been introduced properly during a test measurement by checking for characteristic microbubble harmonic responses. Additionally or alternatively, intracranial pressure measurement device may check for amplitude markers known to be consistently present when microbubbles are present. In a variety of embodiments, the formulation of the microbubbles introduced can be derived by measuring their characteristic microbubble responses.

Bolus injection of microbubbles can be typically characterized by a rapid rise in microbubble concentration in the bloodstream and tissue for several seconds, and then receding from the bloodstream relatively quickly. The entry and rise of concentration of microbubbles can be called a "wash-in," whereas the process of receding can be called a "wash-out." Wash-ins typically can begin within a few seconds of injection and can reach a peak within 5 and 10 seconds. However, depending on the rate of blood flow, it can be a longer or shorter time window.

Wash-out may occur over a longer period than wash-in to get the majority of microbubbles out of the patient's system, but can be longer or shorter depending on the rate of blood flow and condition. While not all microbubbles might not be washed out after this period, the intracranial pressure measurement system can count the microbubbles as receded once the measured concentration has been reduced past a certain threshold. In some embodiments, the threshold may be 70% of a peak harmonic amplitude observed during and/or following wash-in, but any threshold can be used as appropriate to the requirements of a given application. A wide variety of thresholds can be used as appropriate to the requirements of specific embodiments of the invention. The amount of reduction in observed harmonics within a received signal associated with the presence of microbubbles can be obtained by comparing the peak of the detected microbubble wash-in with the baseline acoustic measurements. Further, because the wash-in, wash-out period can be relatively short, the intracranial pressure measurement device can detect the commencement of a wash-in event. In this way, the intracranial pressure measurement device need not rely on user input to determine when an injection of microbubbles is administered. By measuring patterns of blood flow, a diagnosis can be calculated.

Although the present invention has been described in certain specific aspects, many additional modifications and variations would be apparent to those skilled in the art. In particular, any of the various processes described above can be performed in alternative sequences in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive.

What is claimed is:

1. A method for estimating an intracranial pressure of a patient, comprising:
   introducing a tracer into the blood of a patient;
   recording, using an imaging device, the traversal of the tracer through a brain of the patient as a kinetic curve;
   estimating a mean transit time (MTT) of the tracer through the brain of the patient based on the kinetic curve;
   measuring a mean arterial pressure (MAP) of the patient;
   calculating an intracranial pressure index as MAP−Ck/MTT, where C is a constant to scale proportional relationships based on healthy patient population characteristics, and k is a constant in pressure/time; and
   providing the intracranial pressure index.

2. The method of claim 1, further comprising:
   identifying a region of the patient's brain unaffected by a transient vascular abnormality;
   recording the traversal of the tracer through the identified hemisphere; and
   generating the kinetic curve used for identifying the onset and the peak of flow using only the recording of the traversal through the identified brain region.

3. The method of claim 1, wherein C is between 400 and 500.

4. The method of claim 3, wherein C is 448.

5. The method of claim 1, wherein the MAP is calculated as (SP+(2*DP))/3, where SP is systolic pressure of the patient and DP is diastolic pressure of the patent.

6. The method of claim 1, wherein the mean arterial pressure is measured using a blood pressure monitor.

7. The method of claim 1, wherein the tracer comprises microbubbles, and the imaging device is at least one ultrasound transducer.

8. The method of claim 1, wherein estimating MTT comprises:
   identifying a first point and a second on the kinetic curve, where the first point and second point are at repeatably identifiable locations; and
   measuring the distance between the first point and the second point as a value proportional to MTT.

9. The method of claim 1, wherein estimating MTT comprises calculating a full peak/half width parameter from the kinetic curve.

10. The method of claim 1, wherein estimating MTT comprises calculating a half peak/full width parameter from the kinetic curve.

11. An intracranial pressure measurement device, comprising:
    an imaging device;
    a processor; and
    a memory containing an intracranial pressure (ICP) measurement application that configures the processor to:
    record, using the imaging device, the traversal of a tracer through a brain of a patient as a kinetic curve;
    estimate a mean transit time (MTT) of the tracer through the brain of the patient based on the kinetic curve;
    measure a mean arterial pressure (MAP) of the patient;
    calculate an intracranial pressure index as MAP-Ck/MTT, where Cis a constant to scale proportional relationships based on healthy patient population characteristics, and k is a constant in pressure/time; and
    provide the intracranial pressure index.

12. The device of claim 11, wherein the intracranial pressure measurement application further directs the processor to:
    identify a region of the patient's brain unaffected by a transient vascular abnormality;
    record the traversal of the tracer through the identified hemisphere; and
    generate the kinetic curve used for identifying the onset and the peak of flow using only the recording of the traversal through the identified brain region.

13. The device of claim 9, wherein C is between 400 and 500.

14. The device of claim 13, wherein C is 448.

15. The device of claim 11, wherein the MAP is calculated as (SP+(2*DP))/3, where SP is systolic pressure of the patient and DP is diastolic pressure of the patent.

16. The device of claim 15, wherein the intracranial pressure measurement device is communicatively coupled to a blood pressure measurement device configured to record the systolic pressure and diastolic pressure of the patient.

17. The device of claim 16, wherein the blood pressure measurement device is a blood pressure measurement cuff.

18. The method of claim 11, wherein the tracer comprises microbubbles, and the imaging device is at least one ultrasound transducer.

19. The method of claim 11, wherein to estimate MTT, the ICP measurement application further directs the processor to:
    identify a first point and a second on the kinetic curve, where the first point and second point are at repeatably identifiable locations; and
    measure the distance between the first point and the second point as a value proportional to MTT.

20. The method of claim 11, wherein to estimate MTT, the ICP measurement application further directs the processor to calculate a full peak/half width parameter from the kinetic curve.

21. The method of claim 11, wherein to estimate MTT, the ICP measurement application further directs the processor to calculate a half peak/full width parameter from the kinetic curve.

\* \* \* \* \*